May 10, 1938.  W. S. BRINK  2,117,238
TIRE RIM
Filed Dec. 31, 1936  3 Sheets-Sheet 1

INVENTOR
Winfield S. Brink
BY 
ATTORNEY

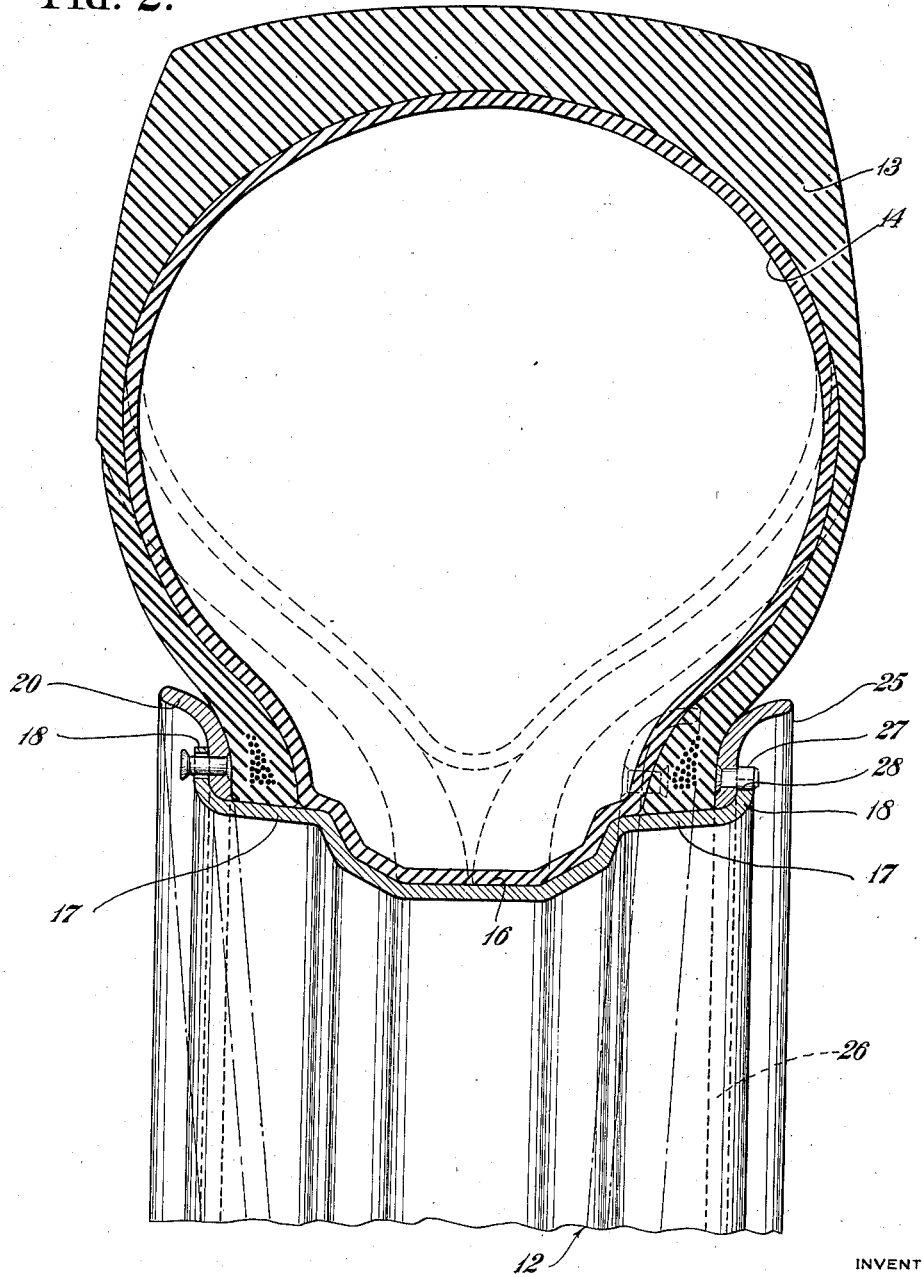

May 10, 1938.  W. S. BRINK  2,117,238
TIRE RIM
Filed Dec. 31, 1936  3 Sheets-Sheet 3

INVENTOR
Winfield S. Brink
BY
Albert L. Ely
ATTORNEY

Patented May 10, 1938

2,117,238

UNITED STATES PATENT OFFICE 2,117,238

TIRE RIM

Winfield S. Brink, Akron, Ohio, assignor to The Firestone Steel Products Company, Akron, Ohio, a corporation of Ohio Application December 31, 1936, Serial No. 118,490

10 Claims. (Cl. 152—21)

This invention relates to tire rims such as are used on wheels equipped with pneumatic tires, and more especially it relates to tire rims comprising at least one removable endless side ring, and designed to carry relatively large tires of normally low inflation pressure such as commonly are used on agricultural tractors.

Because tire rims of the character mentioned are of large diameter, it has been necessary heretofore to provide such large tolerances of diametric measurement that if opposite extremes in sizes of rim base and detachable ring are present in any single assembly, said ring will fit relatively loosely on the base. Such a condition is both undesirable and dangerous since there is a possibility of the ring being blown off the rim base during service use.

The chief objects of this invention are to provide an improved tire rim construction wherein it will be impossible for the endless side ring to become loose during use; and to provide a construction that achieves the foregoing object in a simple and facile manner. Other objects will be manifest as the specification proceeds.

Of the accompanying drawings:

Figure 2 is a section on a larger scale, of the tire and tire rim taken on the line 2—2 of Figure 1;

Figure 4:
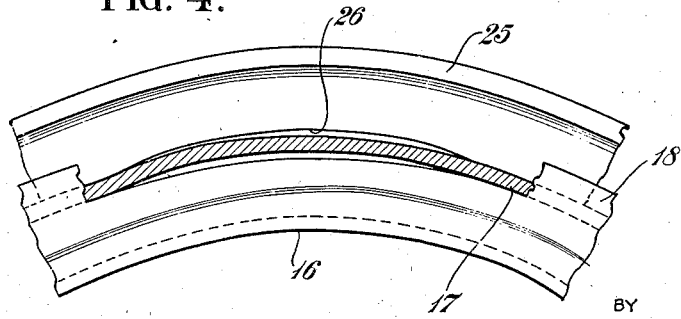
Figure 3:
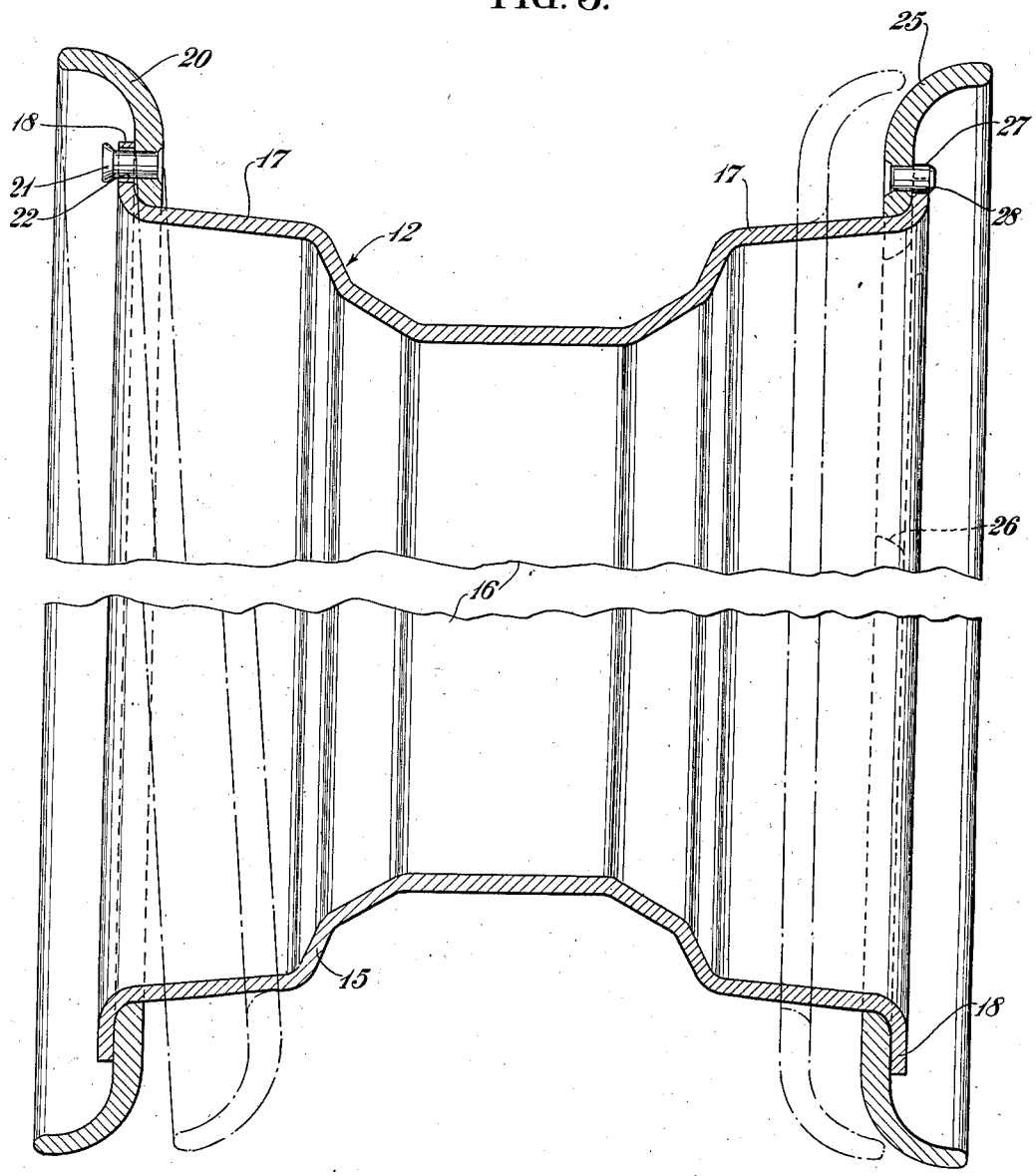

Figure 3 is a diametric sectional view of the improved tire rim per se, a part thereof being broken away; and Figure 4 is a fragmentary side elevation of the tire rim, in the region of one of the local re-entrant or recessed portions of the removable ring, as it appears in service with an inflated tire on the rim, a portion of the latter being broken away and in section to reveal a local deformation thereof.

Figure 1:
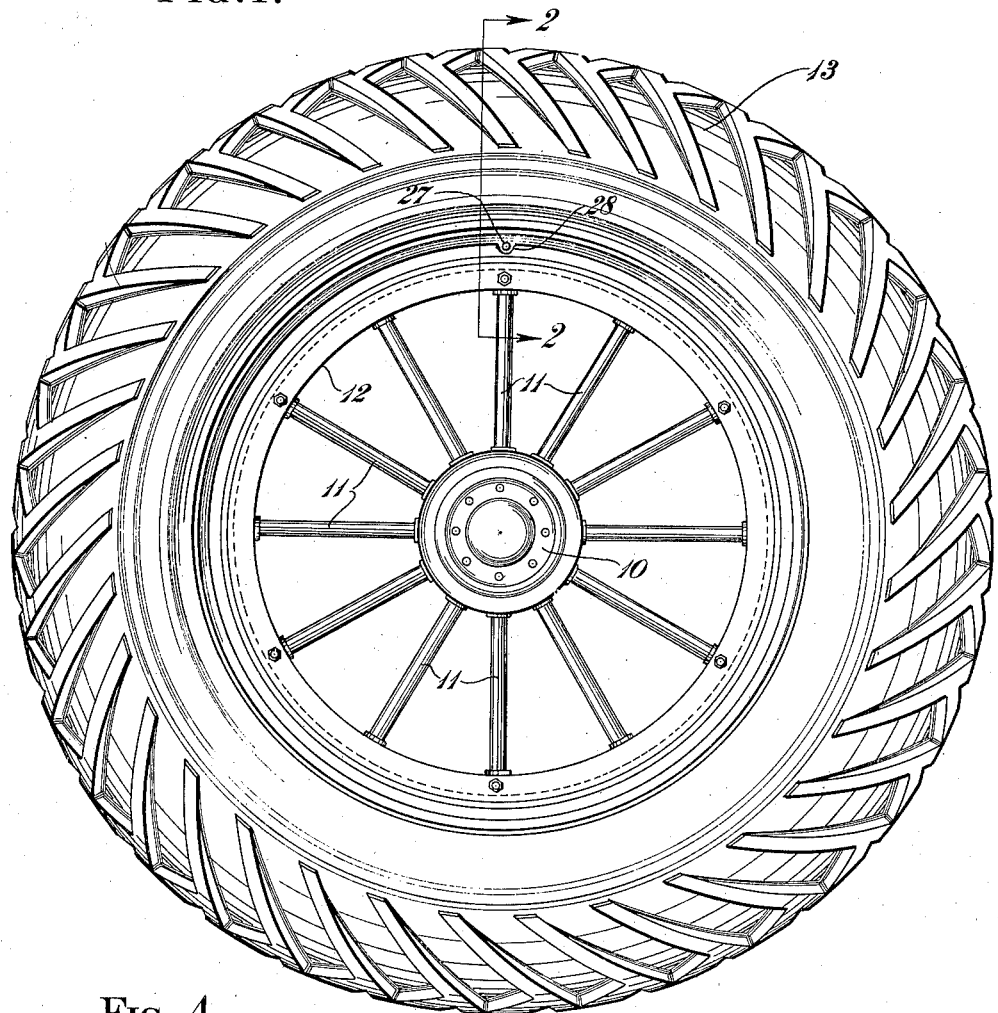
Figure 1 is a side elevation of a wheel employing the improved tire rim, and a pneumatic tire mounted upon the latter.

Referring to Figure 1 of the drawings, there is shown a wheel of an agricultural tire, said wheel comprising a hub 10, spokes 11, 11, a tire rim generally designated 12, and a pneumatic tire 13 mounted upon said rim, the latter including the usual inner tube 14.

The tire rim 12 is of the drop center type, and comprises a metal rim base 15 that is formed with the usual central circumferential well or depression 16. Extending laterally from each side of the well 16 are integral circumferential bead-seating portions 17, 17 adapted to receive and support the respective beads at the inner periphery of the tire 13, said portions 17 being slightly frusto-conical or flared so as to be of progressively greater diameter toward their lateral margins. The tire beads are of such size and shape as to wedge onto the respective portions 17 whereby angular movement of the tire about the axis of the rim is restrained, notwithstanding the low inflation pressure of the tire. The lateral marginal portions of the bead-seating portions 17 are formed with respective, outwardly-extending radial flanges 18, 18.

Mounted upon one of the bead-seating portions 17 of the rim-base 15 is an endless, transversely-arcuate ring 20 adapted to engage the outer lateral face of one of the bead portions of the tire 13. Said ring fits loosely about the portion 17 of the rim base, and is permanently secured to the adjacent flange 18 by means of a headed stud 21 that is riveted to its structure and which projects laterally through an aperture 22 formed in said flange 18. The stud 21 is of greater length than the thickness of the metal of the flange 18, the arrangement being such as to permit limited movement of the ring 20 away from the flange 18, in the region of the stud 21, and to permit such oscillating movement of the diametrically opposite region of the ring as to move said region substantially across the bead-seating region 17 of the rim base, as is shown in broken lines in Figure 3. Thus the ring 20 cannot possibly be separated from the rim-base, yet its mobility may be utilized for forcing the tire bead into the well 16, without damage to said tire bead, in cases where the tire bead tightly embraces or is rusted onto the rim-base portion 17.

Mounted upon the opposite rim-base portion 17 is an endless bead engaging ring 25 of the same cross-sectional shape as the ring 20. It will be observed that the portion of each ring 20, 25 that is disposed radially and parallel to the plane of the rim is of substantially thicker metal than the rim base 15. The ring 25 is formed at diametrically opposite regions of its inner periphery with arcuate slots or recesses, such as the recess 26, that are provided for assisting in the removal of the ring 25 from the rim when the ring is required to pass over the adjacent flange 18 of the rim-base. The ring 25 is of such inside diameter as normally to fit the bead-seating portion 17 of the rim base somewhat laterally of the flange 18, as indicated in broken lines in Figure 3. Then when the tire 13 is inflated, the bead portions of tire are forced laterally outwardly across the bead-seating portions 17 of the rim-base, with the result that ring 25 is forced laterally into abutting relation with the flange 18 on the lateral margin of the rim-base. Because the inside diameter of the ring 25 is smaller than the outside diameter of rim-portion 17 adjacent flange 18, the lateral outward movement of said ring exerts a constrictive force upon said rim portion, with the result that the latter is deformed or distorted radially outwardly in the region of the respective clearance slots 26 of ring 25 as is most clearly shown in Figure 4.

Because the ring 25 is wedged onto the rim-base, it cannot accidentally become detached therefrom. The outward bulging of the rim portions 17 in the regions of the ring-slots 26 provides at least a modicum of mechanical interlock between the rim-base and ring that resists angular movement of the latter in a circumferential direction. However, to provide positive assurance against angular movement of the ring, the latter may be provided with a laterally projecting stud 27 that is engageable in a notch 28 formed in the perimeter of the flange 18.

The invention makes for safety since it is impossible for the ring 25 accidentally to come off the rim-base, yet the ring and tire are easily removed when desired.

Modification may be resorted to without departing from the spirit of the invention or the scope of the appended claims.

What is claimed is:

1. In a tire rim, the combination of a rim base having sloped tire-bead-seating portions, and an endless tire-retaining ring mounted upon said base and of such inside diameter as to have wedging contact with a bead-seating portion thereof when forced laterally by the bead portion of a tire thereon as the latter is inflated.

2. In a tire rim, the combination of a rim-base having sloped tire-bead-seating portions that are flared outwardly toward their lateral margins and formed thereat with respective outwardly extending radial flanges, and an endless tire-retaining ring mounted upon one of said bead-seating portions, the inside diameter of said ring being smaller than the greatest normal outside diameter of said bead-seating portion.

3. In a tire rim, the combination of a rim-base having sloped tire-bead-seating portions that are flared outwardly toward their lateral margins and formed thereat with respective outwardly extending radial flanges, and an endless tire-retaining ring mounted upon one of said bead-seating portions, the inside diameter of said ring being smaller than the greatest normal outside diameter of said bead seating portion, whereby the ring has a wedging action where forced laterally over said bead-seating portion by the inflation of a tire on the rim, and means enabling deformation of one of said members as the result of said wedging action.

4. In a tire rim, the combination of a rim-base adapted to receive a pneumatic tire, and endless rings mounted upon opposite marginal portions of said rim-base and adapted to engage the lateral faces of the tire beads for retaining the tire on the rim when said tire is inflated, at least one of said rings being of smaller inside diameter than the normal outside diameter of the rim portion on which it seats when the tire is fully inflated, and means enabling deformation of the rim-base to compensate for the difference in the diameters of said rim-base and ring.

5. A combination as defined in claim 4 in which the last mentioned means is formed on the endless ring.

6. In a tire rim, the combination of a rim-base adapted to receive a pneumatic tire, and endless rings mounted upon opposite marginal portions of said rim-base and adapted to engage the sides of the tire beads for retaining the tire on the rim when the tire is inflated, at least one of said rings being of smaller inside diameter than the normal outside diameter of the rim portion on which it seats when the tire is fully inflated, and being locally formed with a diametric region of greater extent than its normal inside diameter thereby enabling local deformation of the rim-base to compensate for the difference in the diameters of the said rim-base and ring.

7. In a tire rim, the combination of a rim-base adapted to receive a pneumatic tire, and means on opposite marginal portions of said rim-base for engaging the sides of the tire beads for retaining the inflated tire on the rim, at least one of said means consisting of a removable, endless ring that is of smaller inside diameter than the normal outside diameter of the rim-portion on which it seats when the tire is fully inflated, said ring being formed on its inner periphery with a local, arcuate, recess that enables local deformation of the rim base to compensate for the difference in diameters of the rim-base and ring.

8. In a tire rim, the combination of a rim-base adapted to receive a pneumatic tire, means on opposite marginal portions of the rim base adapted to engage the sides of the tire beads for retaining the inflated tire on the rim, at least one of said means being a removable, endless ring that is of smaller inside diameter than the normal outside diameter of the rim portion on which it seats when the tire is fully inflated, means enabling deformation of the rim-base to compensate for the difference in the diameters of said rim-base and ring, and means for preventing angular movement of said ring about the axis of the rim.

9. In a tire rim, the combination of a rim-base adapted to receive a pneumatic tire, means on opposite marginal portions of the rim-base adapted to engage the sides of the tire beads for retaining the inflated tire on the rim, at least one of said means being a removable endless ring in laterally abutting relation with a radial marginal flange on the rim base, said ring being of smaller inside diameter than the normal outside diameter of the rim portion on which it seats when the tire is fully inflated, means enabling deformation of the rim-base to compensate for the difference in the diameters of the rim base and ring, and means on the ring interlocking with the said rim-flange for preventing angular movement of the ring about the axis of the rim.

10. A combination as defined in claim 9 in which the interlocking means consists of a laterally projecting stud on the removable ring that is engageable in a notch in the perimeter of the rim-flange.

WINFIELD S. BRINK.